US007400593B2

(12) United States Patent
Choi et al.

(10) Patent No.: US 7,400,593 B2
(45) Date of Patent: Jul. 15, 2008

(54) METHOD FOR DISTINGUISHING MBMS SERVICE REQUEST FROM OTHER SERVICE REQUESTS

(75) Inventors: Sung-Ho Choi, Suwon-si (KR); Sun Chunying, Beijing (CN); Li Xiaoqiang, Beijing (CN)

(73) Assignees: Samsung Electronics Co., Ltd (KR); Beijing Samsung Telecom R&D Center (CN)

( * ) Notice: Subject to any disclaimer, the term of this patent is extended or adjusted under 35 U.S.C. 154(b) by 512 days.

(21) Appl. No.: 10/918,148

(22) Filed: Aug. 13, 2004

(65) Prior Publication Data

US 2005/0083913 A1 Apr. 21, 2005

(30) Foreign Application Priority Data

| Aug. 15, 2003 | (CN) | ................................. 03 1 54175 |
| Jan. 6, 2004 | (CN) | ..................... 2004 1 0001353X |
| Oct. 17, 1920 | (CN) | ....................... 2003 1 01014484 |

(51) Int. Cl.
*H04Q 7/00* (2006.01)
(52) U.S. Cl. ........................ 370/310; 370/338; 370/328; 370/341; 370/329; 370/331; 455/453
(58) Field of Classification Search ........ 370/310–310.2, 370/328–329, 331–332, 335, 338, 401, 342–343, 370/345, 349, 351–352; 455/422.1, 428, 455/450–453, 458, 560, 522.1, 403
See application file for complete search history.

(56) References Cited

U.S. PATENT DOCUMENTS

| 7,242,919 | B2 * | 7/2007 | Kim et al. .................... 455/313 |
| 2003/0119452 | A1 * | 6/2003 | Kim et al. ...................... 455/69 |
| 2003/0225887 | A1 * | 12/2003 | Purnadi et al. ............... 709/227 |
| 2004/0017798 | A1 * | 1/2004 | Hurtta et al. ................. 370/352 |
| 2004/0102212 | A1 * | 5/2004 | Sarkkinen et al. ......... 455/552.1 |
| 2004/0157640 | A1 * | 8/2004 | Pirskanen et al. ......... 455/552.1 |
| 2004/0180675 | A1 * | 9/2004 | Choi et al. ................... 455/458 |
| 2004/0185837 | A1 * | 9/2004 | Kim et al. ................. 455/414.3 |
| 2004/0246985 | A1 * | 12/2004 | Kall et al. .................... 370/432 |
| 2005/0015583 | A1 * | 1/2005 | Sarkkinen et al. ........... 713/150 |
| 2006/0109812 | A1 * | 5/2006 | Kim et al. .................... 370/329 |

\* cited by examiner

*Primary Examiner*—George Eng
*Assistant Examiner*—KAmran Afshar
(74) *Attorney, Agent, or Firm*—The Farrell Law Firm, PC

(57) ABSTRACT

The method for distinguishing the MBMS service request from the other service request comprising steps of: sending a message to a UE by a RNC to indicate that the UE needs a RRC or a PS domain connection; sending a message to a SGSN by the UE to indicate it requires MBMS service or dedicated service; and sending different messages to the RNC by the SGSN according to the different service types or messages. This invention can make the SGSN correctly distinguish service requests initiated by different services and then adopt different operations on different service requests accordingly. This kind of differentiated operation can make the SGSN send different signaling to the RNC, which makes the RNC count the number of UEs accurately and avoid the waste of radio resources.

11 Claims, 6 Drawing Sheets

METHOD FOR DISTINGUISHING MBMS SERVICE REQUEST FROM OTHER SERVICE REQUESTS

PRIORITY

This application claims priority to applications entitled "METHOD FOR DISTINGUISHING MBMS SERVICE REQUEST FROM OTHER SERVICE REQUESTS" filed with the Chinese Patent Office on Aug. 15, 2003 and assigned Serial No. 03154175.5, filed on Oct. 17, 2003 and Serial No. 2003101014484, and filed on Jan. 6, 2004 and assigned Serial No. 200410001353X, the contents of each of which are incorporated herein by reference.

BACKGROUND OF THE INVENTION

1. Field of the Invention

This invention relates to 3$^{rd}$ Generation (3G) mobile communication system, especially to a method for SGSN to distinguish MBMS service request from other service requests.

2. Description of the Related Art

MBMS is a new service under standardization by 3$^{rd}$ Generation Mobile Communication System Partnership Project. The MBMS service is an unidirectional point-to-multipoint (p-t-m) (i.e. multimedia data sent from a single data source is transferred to multiple users through network transmission) service. Most remarkable feature of the service is that it can make use of radio resources and network resources efficiently. The MBMS service is mainly used in wireless communication network system, e.g. Wideband Code-Division Multiple Access system, Global System of Mobile Communication, etc. The transmission of the MBMS service data basically includes following several steps, i.e. data source sending, middle network transmission, destination cell on-the-air transmission and user reception. FIG. 3 is a logical figure for network devices of the radio communication system that can provide the MBMS service, in which the MBMS actually makes use of General Packet Radio Data Service (hereinafter referred to as GPRS) as core transmission network. As shown in FIG. 3, Broadcast and Multicast Service Center (hereinafter referred to as BM-SC) is the data source for the MBMS data transmission. Gateway GPRS Supporting Node (hereinafter referred to as GGSN) is used to connect the GRPS network with the external network (such as INTERNET). Gateway GPRS Supporting Node is used to connect BM-SC in the MBMS service and to send MBMS data to specific Service GPRS Supporting Node (hereinafter referred to as SGSN). Cell Broadcast Center (hereinafter referred to as CBC) is the data resource of the cell broadcast, through interconnecting the CBC with the BM-SC in the MBMS, the CBC can provide the MBMS service with declaration function. The SGSN is used to perform access control on a UE as well as mobility management, and sends the MBMS data from the GGSN to the specific Radio Network Controller (hereinafter referred to as RNC) at the same time. The RNC is used to control a group of base stations (hereinafter referred to as NODE B) and sends multimedia data to the specific NODE B. The NODE B (base station) establishes air physical channel for the MBMS service in a certain cell under the control of the RNC. Terminal User Equipment (hereinafter referred to as UE) is the terminal equipment for MBMS data reception.

FIG. 4 gives the whole process from service announcement, user joining, service notification, radio bearer establishment to user's final leaving in the MBMS service.

401 Subscription—establishing the connection between a user and a service provider, and an authorized user may receive the relevant MBMS service.

402 Service announcement—notifying the user of services that will be provided. For example, the system will rebroadcast a football match in Beijing at 7:00 p.m.

403 Joining—indicates that the user joining a group, i.e. the user informs the network that he or she is willing to receive this multicast service.

404 MBMS Session Start—indicates that establishing the network resources for the MBMS data transmission.

405 MBMS notification—indicates that notifying the user of the MBMS data transmission that will be performed right away.

406 Data transmission—indicates the process of transferring the MBMS service data to the user.

407 MBMS Session Stop—indicates that releasing the network resources after the MBMS data transmission is completed.

408 Leaving—corresponding to the joining of 403, which indicates that the user is leaving a group, i.e. the user doesn't want to receive the data of a certain service any more.

In WCDMA system, the system requires each UE to enter the connection state of PMM_CONNECTED when providing conventional packet service for the UE. This state indicates that there is radio resource control (RRC) connection between the UE and the UTRAN, and there is signaling connection between the UE and the SGSN. The signaling interchanged between the UE and the SGSN belongs to Non-Access Signaling, i.e. NAS signaling. This signaling is transparent to the RNC, that is, the RNC doesn't care about the content of the message transferred between the UE and the SGSN. When the UE wants to enter the state of PMM_CONNECTED to establish the signaling connection, it must send the SERVICE REQUEST message or the ROUTING AREA UPDATE REQUEST message to the SGSN. The ROUTING AREA UPDATE REQUEST message is only needed when the UE wants to update its routing area. The SERVICE REQUEST message is used to establish the signaling connection between the PMM_IDLE UE and the SGSN, and to tell the SGSN for what the message transfers, i.e., for transmitting uplink signaling message, uplink data or responding to the paging from the CN. If the service type in the SERVICE REQUEST message is signaling, the SGSN will release the signaling connection between RNC and SGSN after the process of signaling exchanging completes; if the service type in the SERVICE REQUEST message is data, the SGSN will establish the Radio Access Bearer (RAB) for the service in active state so as to establish the Radio Bearer for transferring data for this service; if the service type in the SERVICE REQUEST message is paging response, the SGSN knows whether this paging response aims at data transmission or signaling exchanging so as to make a correct decision to transfer relevant signaling to the user equipment or to establish the RAB. To provide the MBMS service in the WCDMA system, if all users that receive the MBMS service are in PMM_IDLE state, it is possible that a lot of radio resources be used or wasted in the on-the-air interface, for large amount of users are sharing MBMS service at this time. In this case, the method that let part of the user equipments be in PMM_CONNECTED state and the rest be in PMM_IDLE is adopted in UTRAN. Therefore, the Radio Network Controller needs to count the users in PMM_CONNECTED state in its cells only. The reason why the user equipment stays PMM_CONNECTED state is either that this user equipment is receiving other dedicated service or only for MBMS user counting.

Once the RNC finds out that the number of user equipments receiving MBMS service in a certain cell is less than the threshold on switching between the channel of point-to-point and point-to-multipoint, it will recount it so as to prevent that some other user equipments in PMM_IDLE state in this cell are still receiving MBMS data. Referring to FIG. 5 for more information on this process. 501 indicates that the RNC receives the message of "Session Start Indication" from the SGSN, which means the start of MBMS session, and this message generally includes service parameters related to the service, such as Service ID, QoS parameters, etc. The RNC counts the number of UEs that subscribe the service in each cell. This process is mandatory at the beginning of the session. And during the session, if the number of UEs is lower than the threshold on switching from the point-to-multipoint (PTM) to the point-to-point (PTP), then the RNC will start the process of counting the number of UEs. This process continues from 502 to 512. If the RNC finds that the number of UEs is lower than the threshold, then the RNC sends a "MBMS Notification" message to the UE in PMM_IDLE state or maybe also to the UEs in the states of CELL_PCH and URA_PCH. This message includes parameters such as notification reason (MBMS called-party calling), access probability and service ID, etc. The UE in PMM_IDLE state first establishes a RRC connection with the RNC after receiving this message. From 504 to 506, the UE establishes the RRC connection with the RNC, which is consistent with the process described in existing specification, and the unique difference may be the reason for the RRC connection establishment. This reason may be "MBMS called-party calling". The NAS layer of UE sends a "Service Request" message to the SGSN. This service request message is delivered to the SGSN in the 507 RRC message "Initial Direct Transmission" and the 508 Iu signaling "Initial UE Message". When the SGSN receives this message, it sends a message of 509 "MBMS UE Linking Request" to the RNC to deliver all MBMS service IDs that the UE subscribes to the RNC. The RNC returns the message of 510 "MBMS UE Linking Response" back to the SGSN. 511 the RNC adds this UE ID to each service context of the cell that the UE stays in. 512 the RNC counts the number of UEs in each cell. Thus, the process of counting the number of the UE by the RNC is completed.

In the SERVICE REQUEST message sent by the UE to the SGSN, if the service type in the Service Request is data, then the SGSN establishes the RAB for the activated PDP Context, so that the resource allocation is performed on Iu and Uu interface for data transmission. During the process of MBMS UEs counting, when the UE receives the message of "MBMS Notification" from the RNC, if the message indicates that the number of UEs needs to be collected, then the UE will enter the PMM_CONNECTED mode. The UE in PMM_IDLE state sends the "Service Request" message to the SGSN to enter the PMM_CONNECTED mode. If the service type in the service request at this time is also data, then according to the prior art, the SGSN needs to establish the RAB for the activated PDP Context. However, this service request actually aims at the MBMS service and the UE hasn't requested for data transmission of the dedicated service. It shows that faulty operation may be induced on the SGSN. In order to avoid the faulty operation on the SGSN, we propose to add a new service type, i.e. MBMS service, to the service request. Also we can use a new message, i.e. "MBMS Service Notification" to inform the SGSN that the MBMS service subscribed by the UE should be known to the RNC, i.e., the MBMS UE Linking Request shown in FIG. 1.

In the WCDMA system, there is another case in which the UE switches into the PMM_CONNECTED state without transferring the SERVICE REQUEST message, i.e., the case when the UE switches into routing area update. In this case, if we want to have the SGSN notify the RNC of the MBMS service that the UE joined in, we can add an information unit of "MBMS Indication" in the message of "Routing Area Update Request". Also, we can adopt the new message "MBMS Service Notification" to request the SGSN to transfer the MBMS service subscribed by the UE to the SRNC of the UE.

SUMMARY OF THE INVENTION

The object of this invention is to provide a method for distinguishing MBMS service request from other service requests.

To realize above object, a method for distinguishing MBMS service request from other dedicated service request comprising steps of:

sending a message to a UE by a RNC to indicate that the UE needs a RRC or a PS domain connection;

sending a message to a SGSN by the UE for indicating whether the service is MBMS one or dedicated one, or telling the SGSN to notify the RNC of the MBMS service that the UE joined in; and sending different messages to the RNC by the SGSN according to the different service types or messages.

To provide above object, a method for establishing MBMS (Multimedia Broadcasting and Multicasting Service) bearer between network and a user equipment (UE), comprising the steps of;

sending MBMS notification signal to the UE from the network;

receiving the MBMS notification signal by the UE when the UE is in a idle mode;

sending response signal for the notification signal with "MBMS notification response" to the network;

counting number of UEs in a cell which are interested in the MBMS; and sending MBMS data to the UE with point to multipoint type radio bearer.

This invention presents the method for distinguishing MBMS service request from dedicated service request of the UE. Through this method, the SGSN can be made to distinguish the different services and then to execute different operations, which can avoid establishing unnecessary user interface and wasting resources.

DETAILED DESCRIPTION OF THE PREFERRED EMBODIMENTS

Figure 1:
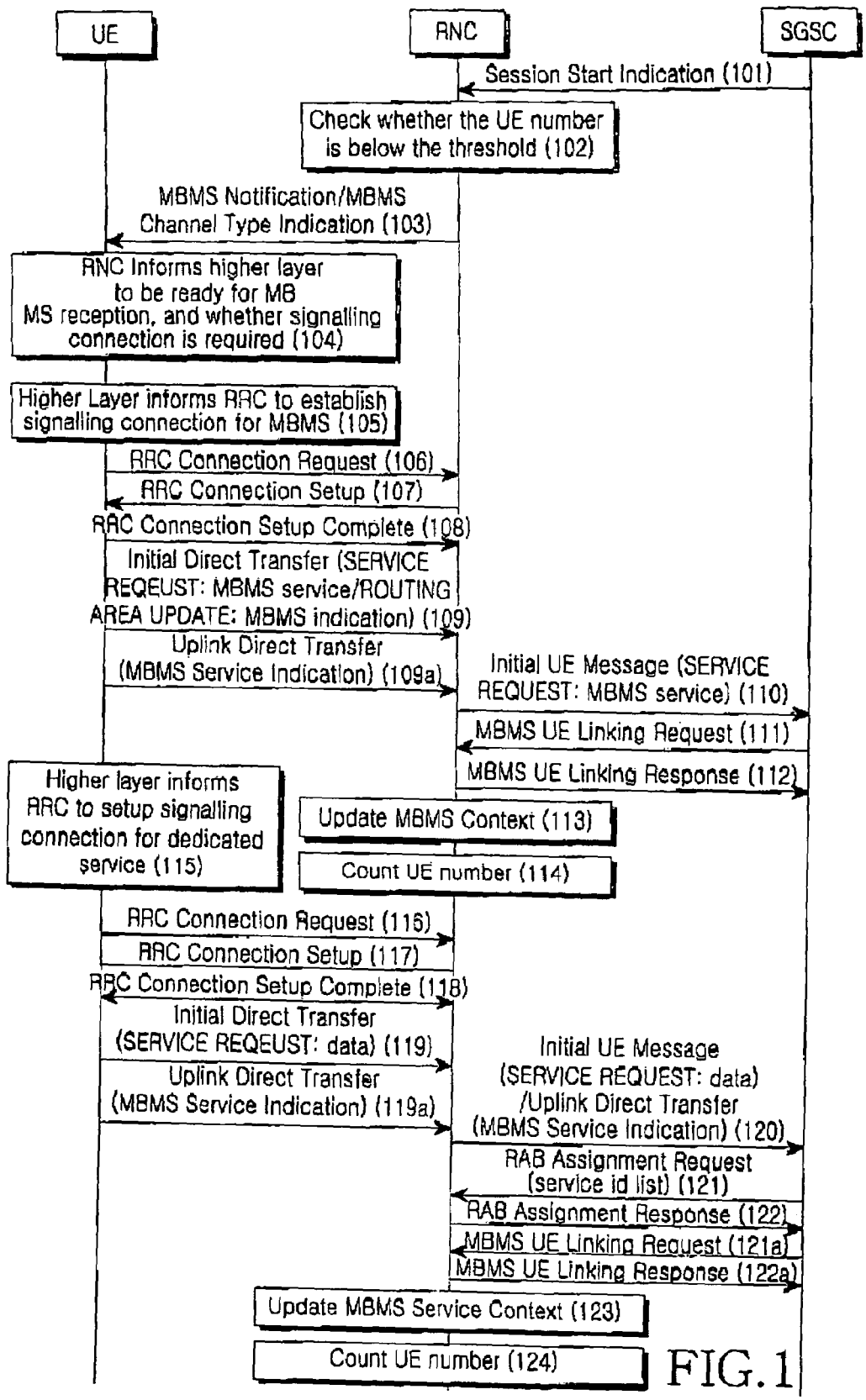
FIG. 1 is the flow for distinguishing MBMS service from other dedicated services.

In the following, the correct examples of this invention will be explained in detail with reference to figures, and only the necessary part of this specification will be explained in the following and other parts will be omitted for emphasis. FIG. 1 describes the service request process between the MBMS UE and the SGSN.

In the present invention, the information unit of "MBMS Service" for indicating the type of MBMS service has been added into the SERVICE REQUEST message so as to indicate whether the user equipment's service request is sent for MBMS service, for dedicated service or for MBMS service and dedicated service. In the present invention, the new message of "MBMS Service Notification" can be added to be transferred between the UE and the SGSN. With this message, the SGSN can be told why the UE switches into PMM_CONNECTED (for the need of MBMS service). The SGSN should send the "MBMS UE Linking" message to the RNC, for telling the RNC all MBMS services subscribed by this UE. Also in the present invention, the information unit of "MBMS Indication" can be added into message "Routing Area Update" to tell the SGSN to send the message of "MBMS UE Linking" to the RNC and to tell the RNC all MBMS services subscribed by this UE. With this method, the SGSN can send relevant messages to the RNC correctly so as to avoid service confusion or waste user interface resource.

In 101 of above FIG. 1, the SGSN notifies the RNC at the beginning of MBMS session, the message includes Service ID, QoS parameters and UE interface information. If the cell under the control of this RNC may include the UE in PMM_IDLE state, this message shall also include the notification field and the RNC needs to send the MBMS notification to corresponding cell in this notification field.

In 102 of above FIG. 1, the RNC counts the number of UEs that stays in PMM_CONNECTED mode in this cell. If the number of UEs is larger than the threshold on switching from PTP to PTM, the RNC sends the message of "MBMS Notification" to all or some cells according to the indication from the SGSN, and indicates that it is unnecessary to count the number of UEs and the UE in PMM_IDLE needn't to enter the PMM_CONNECTED mode. If the number of UEs in some cells is smaller than or equal to the threshold on switching from PTP to PTM, the RNC sends the message of "MBMS Notification" to all or some cells according to the indication from the SGSN, and indicates that it is necessary to count the number of UEs and some of the UEs in PMM_IDLE need to enter the PMM_CONNECTED mode.

In 103 of above FIG. 1, the RNC sends the "MBMS Notification" message to the cells under its control according to the indication from the SGSN. By determining whether to count the number of UEs or not, the RNC sets a "RRC Connection Requirement Indication" as true or false. This MBMS Notification also includes service ID, notification reason and access probability. The notification reason is "Called-party MBMS Calling". During the process of service, the RNC will periodically broadcast the channel type in the cell. When the UE in PMM_IDLE state moves to this cell, if channel type is PTP or the cell didn't provide RB for this service at all, then the RRC of the UE will report this information to upper layer.

In 104 of above FIG. 1, after the RRC layer of the UE receives the message of "MBMS Notification", it will deliver the notification reason as well as service ID to upper layer to notify the incoming of MBMS data. If this message indicates the RRC connection is needed, i.e. "RRC Connection Requirement Indication" is TRUE, the RRC will notify the upper layer that the signaling connection indication is TRUE after performing relevant calculation of access probability. This process can be implemented through the primitive between the RRC and the upper layer. This primitive notifies the upper layer of MBMS service ID, notification reason and signaling connection indication. If the UE knows in 103 that the channel type in the cell is PTP, or this cell didn't provide RB for the service at all, the RRC of the UE will report to the upper layer. The primitive for the report includes service ID, and the signaling connection indication is set as TRUE.

In 105 of above FIG. 1, the upper layer processes this MBMS calling according to the information delivered from the RRC. The upper layer associates the MBMS service ID with the corresponding MBMS Context. If the signaling connection indication shows that the RRC connection is needed, the upper layer notifies the RRC through the primitive to establish a RRC connection, and has the message of "Service Request" included between the upper and lower of the primitives to be delivered to the RRC. Otherwise, the upper layer doesn't need to indicate the RRC to take any action.

From 106 to 108 of above FIG. 1, the RRC establishes the RRC connection according to the upper layer indication. The reason for the RRC connection establishment is MBMS called-party calling. Other operations of the RNC are the same as those in existing specification.

In 109 and 110 of above FIG. 1, the UE transfers the "SERVICE REQUEST" message from the higher layer to the SGSN after establishing the RRC connection.

In this case, the type of service specified in 109 "SERVICE REQUEST" message should be "MBMS Service". This procedure can be realized in following two steps: 109 the UE transfers this message to RNC through the RRC signaling "Initial Direct Transmission"; 110 the RNC transfers this message to the SGSN through Iu signaling "Initial UE Message". Procedure 109 possibly happens in that the user equipment updates the routing area. In this case, the message that the user equipment sends to the SGSN is "Routing Area Update Request". This procedure can be realized in following two steps: 109 the UE transfers this message to the RNC through the RRC signaling "Initial Direct Transmission"; 110 the RNC transfers this message to the SGSN through Iu signaling "Initial UE Message". If the user equipment has learned the information on the MBMS service of this cell via the MCCH before updating the routing area, and yet this MBMS service is not provided in the new cell, then the "Routing Area Update Request" message can contain the information unit of "MBMS Indication"; otherwise, if this message contains no "MBMS Indication" information, the user equipment sends the new message of "MBMS Service indication" to the SGSN after establishing the signaling connection.

In 109*a* of above FIG. 1, the UE sends the message of "MBMS Service Notification" to the SGSN after establishing the signaling connection (through the procedure of service requesting) between itself and the SGSN, for notifying the SGSN of that this UE has joined in some MBMS services, and the SGSN is required to inform the UE's SRNC of this information. The signaling connection between the UE and the SGSN can be established with conventional method. So, no more detail will be given herein. 109*a* the UE transfers this message to the RNC through the RRC signaling "Uplink Direct Transfer"; 110 the RNC transfers this message to the SGSN through the Iu signaling "Direct Transmission". Procedure 109*a* in FIG. 1 also can be used to establish the signaling connection between the UE and the SGSN, here the establishment results from that the MBMS service starts. In other words, the message of "SERVICE REQUEST" in 109 can be replaced with this message absolutely. The UE sends the "MBMS Service indication" message to the SGSN through the RRC signaling "Initial Direct Transfer" and the Iu signaling "Initial UE Message".

In 111 of above FIG. 1, after receiving the message in 110, the SGSN finds out that the requested service is "MBMS Service", "MBMS Service indication" or "MBMS Indication" included in the "Routing Area Update Request" message, and checks the UE context for the saved MBMS service that this UE has joined in. The SGSN sends the "MBMS UE Linking Request" message to the RNC, for notifying the RNC of the identifier of the MBMS that this UE has joined in. The MBMS service identifier can be either the IP multicast address and APN, or the Temporary Mobile Group Identifier (TMGI).

In 112 of above FIG. 1, the RNC acknowledges that it has received the "MBMS UE Linking Request" message and replies the SGSN with the "MBMS UE Linking Response" message.

In 113 of above FIG. 1, the RNC adds the identifier of this UE into the context of the corresponding cell and service.

The procedure from 102 to 114 does not always happen only when the session starts. During the session, if the RNC finds out that the number of users is less than the threshold on switching between point-to-point and point-to-multipoint channel, it can carry out the process of user counting. In this case, the "MBMS Notification" message in 103 contains the service identifier and the RRC connection required indication (which is set as true), and set the type of service in the "SERVICE REQUEST" message as "MBMS Service" or decide to transfer the new message "MBMS Service indication".

If the UE moves to the new cell, it should read out the system information to learn about the Routing Area that the current cell belongs to at first, and it can also learn about the information on the MBMS control channel from the system information. Then, the UE receives MBMS control signaling transferred via this channel according to the configuration of the channel. If the UE finds out that the channel of the current cell to support this service is the point-to-point one or there is no radio bearer, this UE should also perform the procedure from 105 to 109. Now, the UE can transfer the "Routing Area Update Request" message, which contains "MBMS Indication", or transfer the "MBMS Service indication" message after establishing the signaling connection, or transfer the "SERVICE REQUEST" message, in which the service type is set as "MBMS Service". Simultaneously, if some changes have happened to the routing area where the UE locates, and higher layer of the UE is to perform functions like sending out signaling, routing area updating, etc., then the UE can transfer the "Routing Area Update Request" message, which contains "MBMS Indication", or transfer the "MBMS Service Indication" message after establishing the signaling connection. Next, the UE should also perform the procedure from 105 to 109. Certainly, if only the routing area has changed to the UE but the channel of the current cell to support this service is point-to-multipoint one, it is not necessary to include the information unit of "MBMS Indication" in the "Routing Area Update Request" message, or to transfer the "MBMS Service indication" message at all.

If the UE finds out that the routing area has changed after moving to the new cell, but it has no information on the MBMS service of the new cell, then it can send only the "Routing Area Update Request" message to the SGSN. During updating the routing area, the UE can learn about the configuration of the MCCH from the system information. Then, it can learn about the information like the channel type of the MBMS according to the configuration of the MCCH. If the channel for the MBMS service is the point-to-point one, the UE sends the "MBMS Service Notification" message to the SGSN, requesting the SGSN to transfer the list of the MBMS services subscribed by the UE to the RNC.

In 115 of above FIG. 1, the higher layer of the UE determines to receive dedicated services from the packet domain. And now the UE stays in PMM_IDLE state. The higher layer notifies the RRC of establishing the RRC connection and transferring the NAS message of "SERVICE REQUEST" to the SGSN.

From 116 to 118 of above FIG. 1, the RRC establishes the RRC connection according to the indication received from the higher layer, and the reason why to establish the RRC connection is an existing value. Other operations of the RNC are performed in accordance with the available standard.

In 119 and 120 of above FIG. 1, the LE transfers the "SERVICE REQUEST" message received from the higher layer to the SGSN after establishing the RRC connection. And the type of service in the "SERVICE REQUEST" message is set as "data". This procedure can be realized in following two steps: 119 the UE transfers this message to the RNC through the RRC signaling of "Initial Direct Transfer"; 120 the RNC transfers this message to the SGSN through the Iu signaling of "Initial UE Message".

Or in 119a and 120 of above FIG. 1, the UE may transfer the "MBMS Service indication" message to the SGSN. This procedure can be realized in following two steps: 119a the UE transfers this message to the RNC through the RRC signaling of "Uplink Direct Transfer"; 120 the RNC transfers this message to the SGSN through the Iu signaling of "Direct Transfer". In 121 of above FIG. 1, if the SGSN finds that the type of service requested by the UE is data, it will check the MM context of the UE to find out which services' PDPs are activated. The SGSN establishes the Radio Access Bearer for these services. The SGSN sends the "RAB Assignment Request" message to the RNC, decides the parameters like the QoS parameter that supports this service, etc., this message also possibly contains the list of the MBMS service that the UE has joined in if it has been detected by the SGSN.

In 122 of above FIG. 1, the RNC replies the SGSN with the "RAB Assignment Response" and establishes Iu user interface to provide data transmission channel for this service.

In 121a of above FIG. 1, after receiving the message in 120, the SGSN finds out that the requested service is "MBMS Service" or the "MBMS Service Notification" message and checks the UE context for the saved MBMS service that this UE has joined in. The SGSN sends the "MBMS UE Linking Request" message to the RNC, for notifying RNC of the identifier of the MBMS that this UE has joined in. The MBMS service identifier can be either the IP multicast address and APN, or the Temporary Mobile Group Identifier (TMGI).

In 122a of above FIG. 1, the RNC acknowledges that it has received the "MBMS UE Linking Request" message and replies the SGSN with the "MBMS UE Linking Response" message.

In 123 of above FIG. 1, the RNC adds the identifier of this UE into the context of the corresponding cell and service.

In 124 of above FIG. 1, the RNC counts the number of users of every service in the cell so as to determine whether the channel type is point-to-point or point-to-multipoint. The procedure from 115 to 124 can be conducted either before or during the session.

There is another case that has not been described in FIG. 1, i.e., when the session starts, the SRNC will send the message to the UEs in RRC connection and PMM_IDLE state to make them switch into PMM_CONNECTED state. The UE switches into PMM_CONNECTED state for the MBMS. Therefore, we can adopt the three methods illustrated in figure: the type of service in the "SERVICE REQUEST" message is set as "MBMS Service", or send the new message of "MBMS Service Notification", or add the information unit of "MBMS Indication" into the "Routing Area Update Request" message. After receiving this message, the SGSN also sends the UE Linking message to the UE. This procedure is consistent basically with that from 115 to 124 in FIG. 1 except that the RRC establish procedure from 116 to 118 is not needed.

The embodiments described in the present invention aims at explaining certain examples for implementing the inventive method; it does not refer to all embodiments of the present invention. Any scenario that is sent from the UE to the CN to make the CN perform the UE linking procedure belongs to the scope of the present invention.

Embodiments

1) Node Processing Flow of the UE

Figure 2:
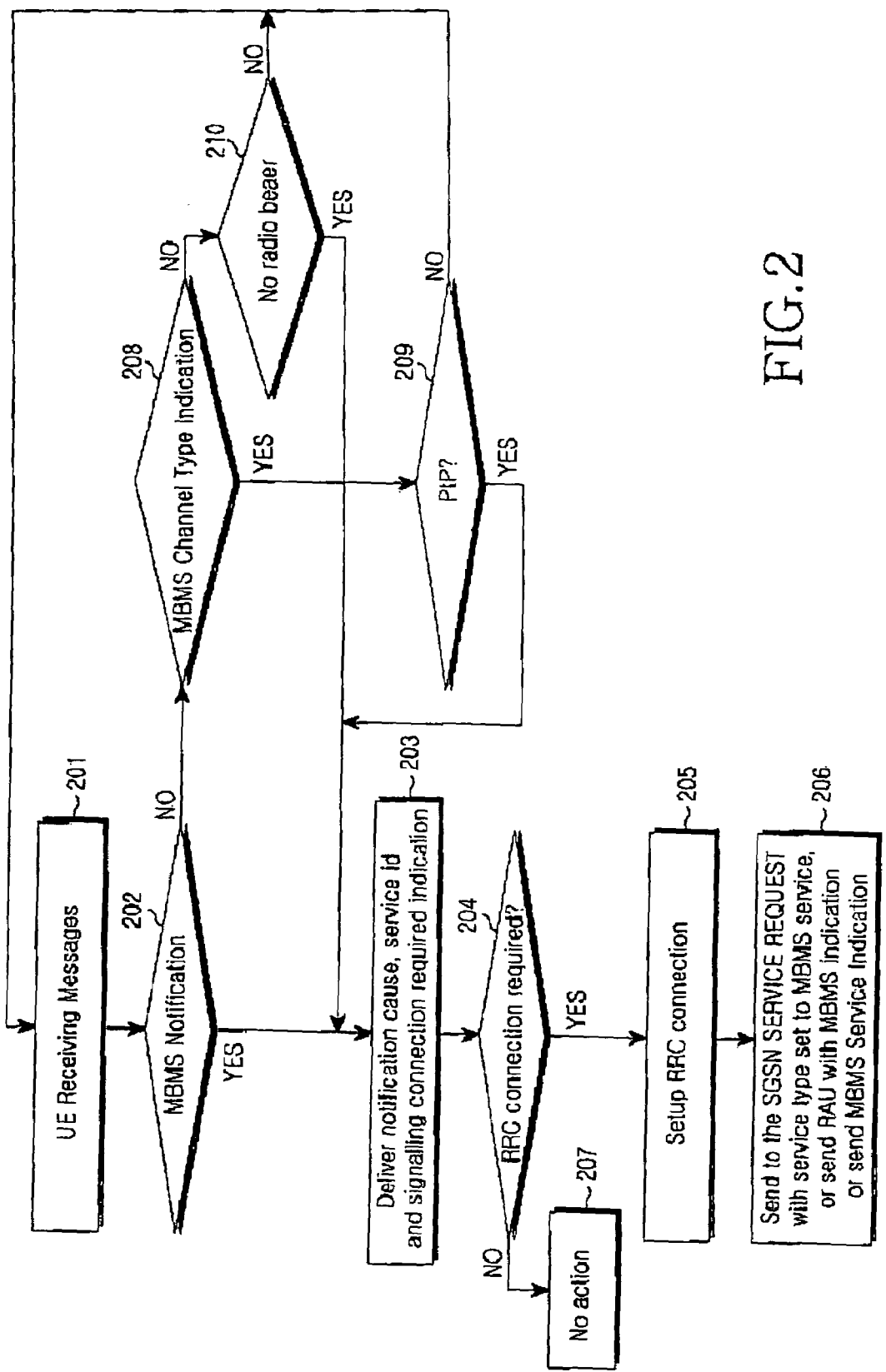
FIG. 2 shows the actions of the UE node.
Figure 3:
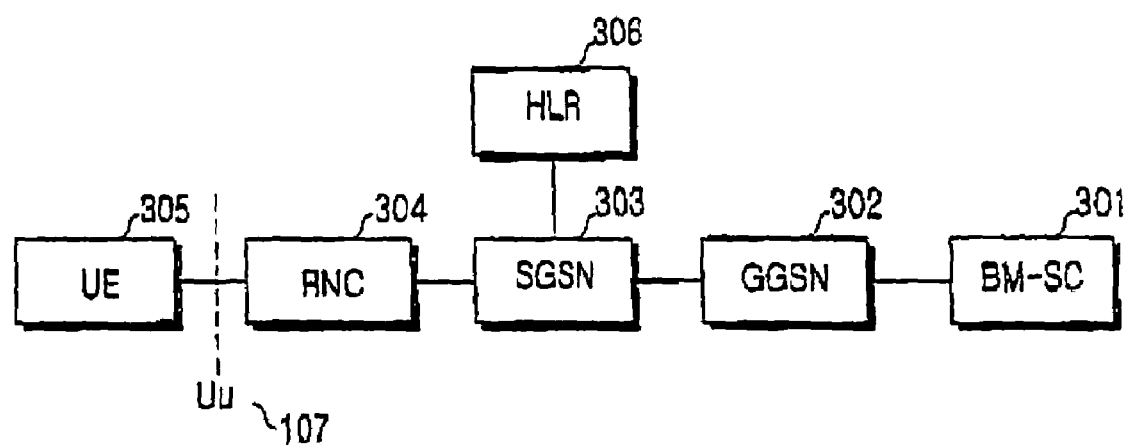
FIG. 3 is the illustration of the MBMS system structure.
Figure 4:
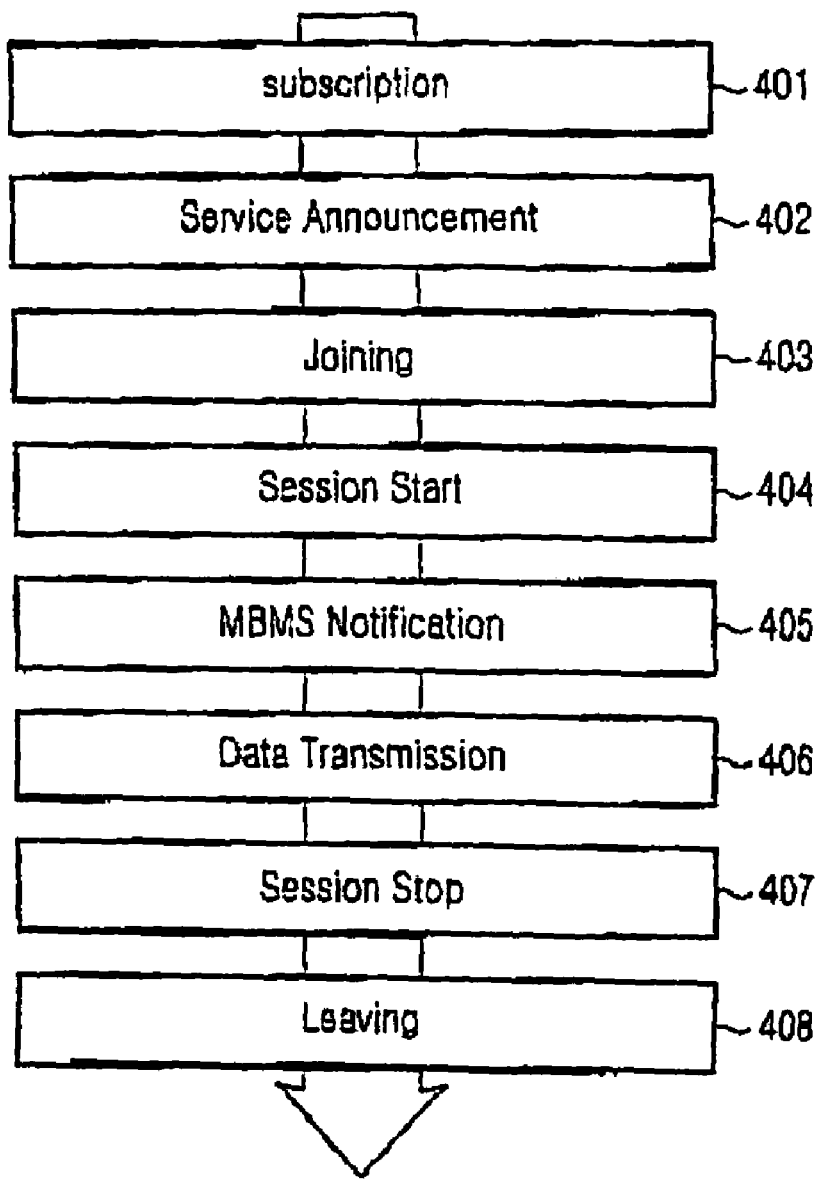
FIG. 4 is the flowchart of the MBMS multicast service.
Figure 5:
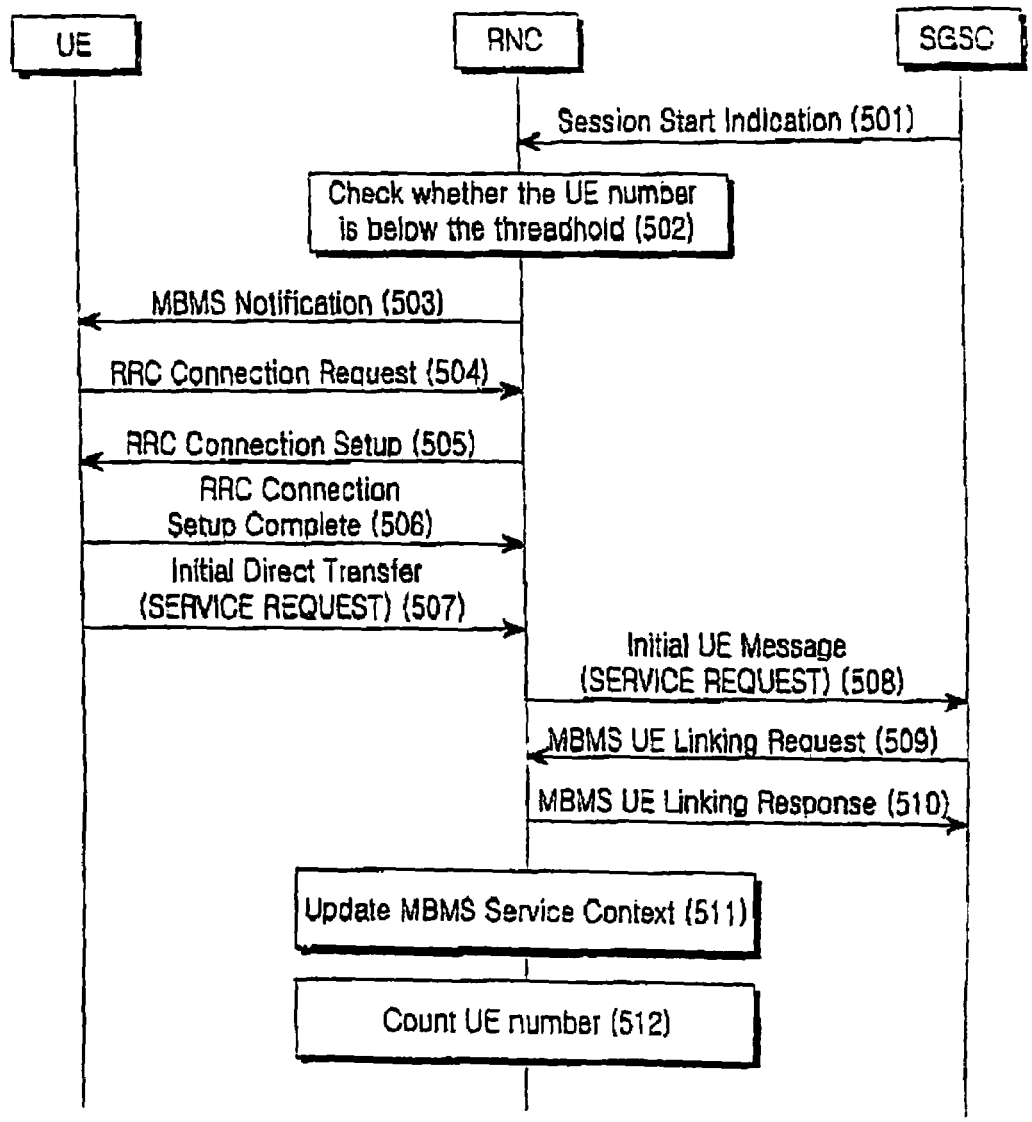
FIG. 5 is the flow for counting the number of UEs.

FIG. 2 describes the node processing flow of UE. Step 201 indicates that the UE receives message from the RNC. In step 202, judging whether the message received by the UE is the "MBMS Notification". If yes, go to Step 203; otherwise, go to Step 201. In Step 203, the RRC of the UE delivers the service ID and the notificaiton reason obtained from the "MBMS Notification" message to the upper layer. If the "RRC connection required" of the message is TRUE, then the signaling connection indication is TRUE; otherwise, the signaling connection indication is FALSE. The RRC of the UE tell the upper layer whether to establish the signaling connection via the signaling connection indication in the primitive or not. If the RRC of the UE knows that the channel type of target cell is PTP or the target cell doesn't provide RB for the MBMS service it is receiving at all, then the RRC of the UE tells to upper layer to establish the signaling connection via a primitive, i.e. the signaling connection indication is TRUE. In Step 204, the upper layer judges whether to establish the signaling connection. If yes, go to 205; otherwise go to 207. In Step 205, the upper layer instructs the RRC to establish the RRC connection and go to 206. In Step 206, the UE sends the message of "Service Request" to the SGSN, whose service type is "MBMS service". In Step 207, the upper layer won't take any operation any more. In Step 208, judging whether the message received is a "MBMS Channel Type Indication", if yes, go to 209, otherwise, go to 210. In step 209, judging if the channel type of the target cell is PTP, if yes, go to 203, otherwise, go to 201. In Step 210, if the target cell doesn't provide RB for the MBMS that the UE is receiving at all, go to 203.

2) The Node Processing Flow of the SGSN

Figure 6:
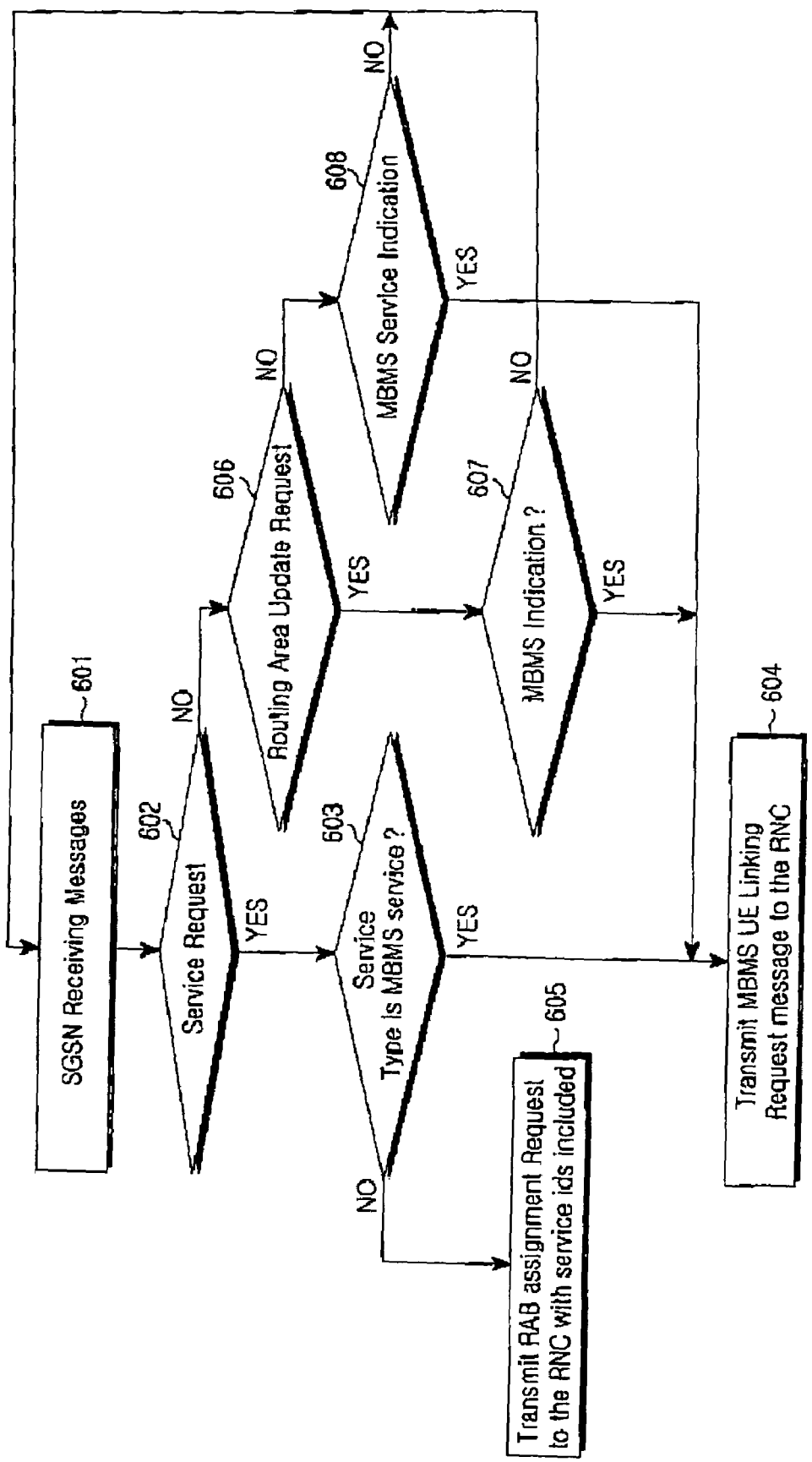
FIG. 6 shows the actions of the SGSN node.

FIG. 6 shows the node actions of the SGSN.

In Step 601, indicating that the SGSN receives a mesage from the UE.

In step 602, judging whether the message received by the SGSN is the "Service Request", if yes, go to 603, otherwise, go to 601.

In step 603, judging whether the service type is "MBMS service". If yes, go to 604; otherwise, go to 605.

In Step 604, the SGSN checks its UE Context and sends the message of "MBMS UE Linking Request" to the RNC, which includes the MBMS service ID that the UE has joined in.

In Step 605, the SGSN checks UE Context and extablishes the RAB for PDP already in the ACTIVE state. The SGSN sends the message of "RAB Assignment Request" to the RNC, which not only carries the MBMS service ID that UE has joined in but also the parameters for user interface establishment and QoS parameters.

In Step 606, the SGSN judges whether the received message is the "Routing Area Update Request" message or not, if so, the process goes to 607, if not goes to 608.

In Step 607, the SGSN judges whether the received message contains the information unit of "MBMS Indication" or not, if so, the process goes to 604, if not goes to 601.

In Step 608, the SGSN judges whether the received message is the "MBMS Service Notification" message or not, if so, the process goes to 604, if not goes to 601.

What is claimed is:

1. A method for distinguishing Multimedia Broadcasting and Multicasting Service (MBMS) service request from other dedicated service request comprising steps of:

sending a message to a User's Equipment (UE) by a Radio Network Controller (RNC) to notify that Radio Resource Control (RRC) connection is available for the MBMS service;

selecting one of the Service Request message. Routing Area Update Request message, or MBMS service Indication message to indicate whether the UE requires the MBMS service and sending the selected message from the UE to a Serving GPRS Support Node (SGSN); and sending different messages to the RNC by the SGSN according to the selected message sent from the UEs.

2. The method according to claim 1, wherein the Service Request message is with service type set to MBMS Service.

3. The method according to claim 1, wherein the RRC of the UE sends an indication primitive to the upper NAS layer.

4. The method according to claim 3, wherein said indication primitive notifies of MBMS service ID, notification reason and signaling connection indication.

5. The method according to claim 1, wherein the Routing Area Update Request message comprises parameter indications indicating that the SGSN informs the RNC the identifiers of the MBMS services that the UE has joined in.

6. The method according to claim 1, wherein the MBMS service Indication message comprises indications indicating that the SGSN informs the RNC the identifiers of MBMS services that the UE has joined in.

7. The method according to claim 6, wherein said message is used to establish the signaling connection between the UE and the SGSN.

8. A method for establishing MBMS (Multimedia Broadcasting and Multicasting Service) bearer between network and a user equipment(UE), comprising the steps of;

sending MBMS notification signal to the UE from the network;

receiving the MBMS notification signal by the UE when the UE is in a idle mode;

selecting by the UE one of the Service Request message, Routing Area Update Request message, or MBMS service Indication message to indicate whether the UE requires the MBMS service and sending the selected message with "MBMS notification response" to the network;

counting number of UEs in a cell which are interested in the MBMS; and sending MBMS data to the UE with point to multipoint type radio bearer.

9. The method according to claim 8, wherein the UE sends a "Routing Area Update Request" message comprising parameter indications to the network, which indicates that a SGSN informs the RNC identifiers of the MBMS services that the UE has joined in.

10. The method according to claim 8, wherein the UE sends a "MBMS Service indication" message to the network, which indicates a SGSN informs the RNC the identifiers of MBMS services that the UE has joined in.

11. The method according to claim 8, wherein the UE sends a "Service Request message to the network, which is with a service type set to MBMS Service.

* * * * *